(12) United States Patent
Chou et al.

(10) Patent No.: US 7,084,199 B1
(45) Date of Patent: Aug. 1, 2006

(54) THERMOPLASTIC OLEFIN NANOCOMPOSITE

(75) Inventors: Chai-Jing Chou, Missouri City, TX (US); Eddy I. Garcia-Meitin, Angleton, TX (US); Lonnie Schilhab, Lake Jackson, TX (US); Richard F. Fibiger, Midland, MI (US)

(73) Assignee: The Dow Chemical Company, Midland, MI (US)

(*) Notice: Subject to any disclaimer, the term of this patent is extended or adjusted under 35 U.S.C. 154(b) by 0 days.

(21) Appl. No.: 10/169,483

(22) PCT Filed: Dec. 29, 1999

(86) PCT No.: PCT/US00/34707

§ 371 (c)(1),
(2), (4) Date: Oct. 30, 2002

(87) PCT Pub. No.: WO01/48080

PCT Pub. Date: Jul. 5, 2001

Related U.S. Application Data

(60) Provisional application No. 60/173,608, filed on Dec. 29, 1999.

(51) Int. Cl.
*C08K 3/34* (2006.01)

(52) U.S. Cl. ............... 524/445; 524/442; 524/492; 524/493; 524/500; 524/502; 524/261

(58) Field of Classification Search .......... 524/445, 524/261, 442, 492, 493, 500, 502
See application file for complete search history.

(56) References Cited

U.S. PATENT DOCUMENTS

| | | | | |
|---|---|---|---|---|
| 4,891,399 A | * | 1/1990 | Ohkawa et al. | 523/200 |
| 4,960,816 A | * | 10/1990 | Rice | 524/425 |
| 5,256,719 A | * | 10/1993 | Sham et al. | 524/436 |
| 5,530,052 A | * | 6/1996 | Takekoshi et al. | 524/447 |
| 5,910,523 A | * | 6/1999 | Hudson | 523/213 |
| 6,225,394 B1 | * | 5/2001 | Lan et al. | 524/445 |
| 6,228,903 B1 | * | 5/2001 | Beall et al. | 523/209 |
| 6,232,388 B1 | * | 5/2001 | Lan et al. | 524/445 |
| 6,410,635 B1 | * | 6/2002 | Kaylo et al. | 524/447 |
| 6,414,070 B1 | * | 7/2002 | Kausch et al. | 524/445 |

FOREIGN PATENT DOCUMENTS

| | | |
|---|---|---|
| WO | 00/47657 | 8/2000 |
| WO | WO-01-48080 A1 * | 7/2001 |

OTHER PUBLICATIONS

Y.Kurokawa, et al; "Structure and Properties of a Montmorillonite/Polypropylene Nanocomposite"; pp. 1670-1672; (1997); Journal of Material Science Letters, vol. 16.
Michael Alexandre, et al; "Polymer-Layered Silicate Nanocomposites: Preparation, Properties and Uses of a New Class of Materials", pp. 1-63; (2000); Materials Science and Engineering, vol. 28.

* cited by examiner

*Primary Examiner*—David W. Wu
*Assistant Examiner*—Henry S. Hu
(74) *Attorney, Agent, or Firm*—Susan Moeller Zerull

(57) ABSTRACT

A polypropylene nanocomposite composition having at least the following two elements. The first element is a maleated polypropylene polymer having a weight average molecular weight greater than 100,000. The second element is a cation exchanging layered silicate material dispersed in the maleated polypropylene so that more than one half of the layers of the cation exchanging layered silicate material are present as one, two, three, four or five layer units upon examination by electron microscopy. A thermoplastic olefin nanocomposite composition can be obtained by interdispersing a thermoplastic elastomer phase with the above-described polypropylene nanocomposite composition.

32 Claims, 1 Drawing Sheet

THERMOPLASTIC OLEFIN NANOCOMPOSITE

This application claims the benefit of Provisional Application No. 60/173,608, filed Dec. 29, 1999.

This application is under a United States Government contract with The Department of Commerce (NIST)-Advanced Technology Program Project #70NANB7H3028.

BACKGROUND

This invention relates to thermoplastic polyolefin (TPO) incorporating polypropylene reinforced with delaminated or exfoliated cation-exchanging multi-layered silicates.

In their natural state, the layers of cation-exchanging multi-layered silicates, such as montmorillonite, are held together by ionic bonds to the exchangable cations. As discussed by Kawasumi et al. in Macromolecules, 1997, 6333–6338, when such silicates are blended with softened or melted polypropylene, the resulting shear forces are not sufficient to delaminate or exfoliate the silicate layers even when the cation is a quaternary ammonium ion because polypropylene is a relatively non-polar material.

Usuki et al., U.S. Pat. No. 5,973,053, solved this problem using two related approaches. The first approach (also described by Kawasumi et al.) was to blend a quaternary ammonium exchanged multi-layered silicate with a maleic anhydride modified polypropylene oligomer and then add an unmodified polypropylene polymer. The maleic anhydride modified polypropylene oligomer had sufficient polarity to exfoliate the silicate under the shear conditions of the blending process.

The second approach of Usuki et al. was to blend a quaternary ammonium exchanged multi-layered silicate with a maleic anhydride modified polypropylene polymer. The maleic anhydride modified polypropylene polymer had sufficient polarity to exfoliate the silicate under the shear conditions of the blending process.

Usuki et al. pointed out that when a maleic anhydride modified polypropylene oligmer was not used, then the average molecular weight of the maleic anhydride modified polypropylene polymer should be limited to about 100,000.

Thermoplastic olefin (TPO) is a mechanical blend of a polyolefin (such as polypropylene) and a thermoplastic elastomer (such as EPDM or ultra low density polyethylene). The use of polypropylene based TPO articles at a low temperature is limited because polypropylene based TPO has relatively poor low temperature impact toughness.

SUMMARY OF THE INVENTION

The instant invention provides a polypropylene based TPO nanocomposite with a significantly increased low temperature impact toughness. Suprisingly, the key to achieving such toughness is the use of maleated polypropylene polymer having a molecular weight greater than 100,000.

More specifically, the instant invention is a thermoplastic olefin nanocomposite composition, comprising: a maleated polypropylene polymer phase having a weight average molecular weight greater than 100,000; a cation exchanging layered silicate material dispersed in the maleated polypropylene phase so that more than one half of the cation exchanging layered silicate material is present as one, two, three, four or five layer units upon examination by electron microscopy; and a thermoplastic elastomer phase interdispersed with the maleated polypropylene phase.

More generally, the instant invention is a polypropylene nanocomposite composition, comprising: a maleated polypropylene polymer having a weight average molecular weight greater than 100,000; and a cation exchanging layered silicate material dispersed in the maleated polypropylene phase so that more than one half of the cation exchanging layered silicate material is present as one, two, three, four or five layer units upon examination by electron microscopy.

An article of manufacture comprising an object formed of a composition comprising: a maleated polypropylene polymer phase having a weight average molecular weight greater than 100,000; a cation exchanging layered silicate material dispersed in the maleated polypropylene phase so that more than one half of the cation exchanging layered silicate material is present as one, two, three, four or five layer units upon examination by electron microscopy; and a thermoplastic elastomer phase interdispersed with the maleated polypropylene phase.

An article of manufacture comprising an object formed of a composition comprising: a maleated polypropylene polymer having a weight average molecular weight greater than 100,000; and a cation exchanging layered silicate material dispersed in the maleated polypropylene so that more than one half of the cation exchanging layered silicate material is present as one, two, three, four or five layer units upon examination by electron microscopy.

A process for producing a thermoplastic olefin nanocomposite composition, comprising the steps of: mixing a softened or melted polypropylene polymer with an organic peroxide and maleic anhydride to form a maleated polypropylene polymer; mixing the maleated polypropylene polymer with an onium treated cation exchanging layered silicate material to form a maleated polypropylene nanocomposite; and mixing the maleated polypropylene nancomposiite with a thermoplastic elastomer, the process characterized by the maleated polypropylene having a weight average molecular weight greater than 100,000.

A process for producing a polypropylene nanocomposite composition, comprising the steps of: mixing a softened or melted polypropylene polymer with an organic peroxide and maleic anhydride to form a maleated polypropylene polymer; and mixing the maleated polypropylene polymer with an onium treated cation exchanging layered silicate material to form a maleated polypropylene nanocomposite, the process characterized by the maleated polypropylene having a weight average molecular weight greater than 100,000.

DETAILED DESCRIPTION OF THE INVENTION

Figure 1:
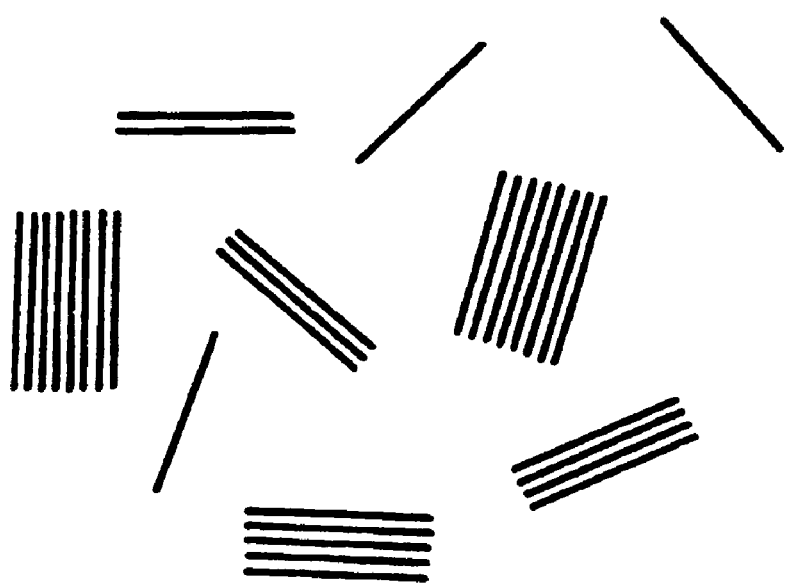
FIG. 1 is an idealized drawing made from an electron photomicrographic examination of the maleated polypropylene phase of a TPO composition of the instant invention showing more than one half of the cation exchanging layered silicate material being present as one, two, three, four or five layer units.

The thermoplastic olefin (TPO) nanocomposite of the instant invention comprises a maleated polypropylene polymer phase having a weight average molecular weight greater than 100,000, a cation exchanging layered silicate material dispersed in the maleated polypropylene so that more than one half of the cation exchanging layered silicate material is present as one, two, three, four or five layer units upon examination by electron microscopy (and most preferably, more than one half of the material is so apparent as one, two or three layer units) and a thermoplastic elastomer phase interdispersed with the maleated polypropylene phase. Suprisingly, the weight average molecular weight of the maleated polypropylene polymer can be significantly greater than 100,000, for example, it can be greater than 150,000 or even greater than 250,000.

Referring now to FIG. 1, therein is shown a drawing reproduction of an electron photomicrograph of the maleated polypropylene polymer phase of a TPO composition of the instant invention. The layered silicate material is shown delaminated or exfoliated as: three single layer units, one two layer unit, one three layer unit, one four layer unit, one five layer unit and two eight layer units. A one layer unit typically is a platlet about 1–10 nanometers thick and 100–1000 nanometers wide.

The term "weight average molecular weight" is well known in the instant art and can be determined by, for example, gel permeation chromatography. The term "cation exchanging layered silicate material" is well known in the instant art and includes the "clay mineral" of U.S. Pat. No. 5,973,053, fully incorporated herein by reference. Examples of cation exchanging layered silicate materials include:

1) biophilite, kaolinite, dickalite or talc clays,
2) smectite clays,
3) vermiculite clays,
4) mica,
5) brittle mica,
6) Magadiite
7) Kenyaite,
8) Octosilicate,
9) Kanemite,
10) Makatite, and
11) Zeolitic layered materials such as ITQ-2, MCM-22 precursor, exfoliated ferrierite and exfoliated mordenite.

Many of the above clay materials exist in nature, and also can be synthesized, generally in higher purity than the native material. Any of the naturally occurring or synthetic cation exchanging layered silicate clay materials may be used in the present invention. Preferred are smectite clays, including montmorillonite, bidelite, saponite and hectorite.

An "onium treated cation exchanging layered silicate material" is a cation exchanging layered silicate material that has been exposed to onium cations (usually oranic quaternary ammonium compounds) so that the original cation of the cation exchanging layered silicate material is exchanged, at least in part, for the onium cations.

Onium treated cation exchanging layered silicate materials are well known in the instant art, for example, see the above mentioned U.S. Pat. No. 5,973,053. Onium treated cation exchanging layered silicate materials are commercially available from, for example, Southern Clay Company in the United States.

The term "maleated polypropylene" means a polypropylene containing more than one tenth of one percent of maleic anhydride grafted to the polypropylene. Maleated polypropylene is commercially available from several sources. Polymer synthesis may be the best way to tailor the molecular weight, molecular weight distribution and the extent of maleic anhydride grafting to the polymer. Solid state maleation in a solution at a temperature below the melting temperature of the polypropylene is another way of preparing maleated polypropylene. Alternatively, as is well known in the instant art, maleated polypropylene can be made by mixing softened or melted unmodified polypropylene with maleic anhydride and an organic peroxide.

Preferably, the weight percent of maleic anhydride of the maleated polypropylene is in the range of from two tenths of one percent to ten percent. Most preferably, the weight percent of maleic anhydride of the maleated polypropylene is in the range of from one half of one percent to two percent.

The amount of cation exchanging layered silicate material used can range from one to fifty percent by weight of the composition. Preferably the cation exchanging layered silicate material in the composition is more than one percent and less than thirty percent. More preferably, the amount of cation exchanging layered silicate material used ranges from three to twelve percent by weight of the composition. The polypropylene nanocomposite composition of the instant invention is obtained when the above discussed thermoplastic elastomer is not used.

The TPO nanocomposite or polyropylene nanocomposite of the instant invention can also contain conventional macro sized fillers such as a carbonate, glass fibers, kaolin, talc, glass beads, graphite fibers and carbon black. The maleated polypropylene of the instant invention can be high crystallinity maleated polypropylene. The term "high crystallinity" is defined herein as material which has a heat of melting of the maleated polypropylene crystallites of more than 85 Joules per gram of amorphous and crystalline phases of the polymer using the determination outlined on pages 448–494 of Volume 4 of the Encyclopedia of Polymer Science and Engineering, $2^{nd}$ Edition, 1986, John Wiley & Sons.

The TPO nanocomposite or polypropylene nanocomposite of the instant invention can also comprise non-maleated polypropylene having a weight average molecular weight greater than 100,000. Preferably, the TPO nanocomposite or polypropylene nanocomposite of the instant invention is essentially free of maleated polypropylene oligomer, that is, the concentration of maleated polypropylene oligomer is less than five percent of the total amount of polypropylene. The term "oligomer" herein means a polymer having a molecular weight of less than one thousand. The non-maleated polypropylene can be any type of polypropylene, for example, block co-polymers of polypropylene and ethylene.

The TPO nanocomposite of the instant invention can be made by mixing a heat softened or melted polypropylene polymer of sufficiently high molecular weight with an organic peroxide and maleic anhydride to form a maleated polypropylene polymer which can then mixed with an onium treated cation exchanging layered silicate material and a thermoplastic elastomer.

Another way of making the TPO nanocomposite of the instant invention is to mix a heat softened or melted polypropylene polymer of sufficiently high molecular weight with an organic peroxide and maleic anhydride to form a maleated polypropylene polymer, then mix the maleated polypropylene polymer with an onium treated cation exchanging layered silicate material and then to mix in the thermoplastic elastomer.

Similarly, the polypropylene nanocomposite of the instant invention can be made by mixing a heat softened or melted polypropylene polymer of sufficiently high molecular weight with an organic peroxide and maleic anhydride to form a maleated polypropylene polymer which can then mixed with an onium treated cation exchanging layered silicate material.

The TPO nanocomposite or polypropylene nanocomposite of the instant invention can be used, for example, to make articles of manufacture such as parts for motor vehicles, appliances, business machines or construction articles.

COMPARATIVE EXAMPLE

Fifty seven parts by weight of maleated polypropylene having a weight average molecular weight of 50,000 (PP EPOLENE G3003 brand maleated polypropylene from Eastern Chemical Company), thirty three parts by weight of thermoplastic elastomer (AFFINITY 8180 brand low density polyethylene from Dow) and ten parts by weight onium treated cation exchanging layered silicate material (montmorillonite treated with dimethyl, dihydrogenated tallow quaternary ammonium compound from Southern Clay) are mixed in a BANBURY brand polymer mixer at 100 rpm and a temperature of 150 degrees Celsius for ten minutes to produce a thermoplastic olefin nanocomposite having a flex modulus of 207,000 pounds per square inch and a notched IZOD impact strength at 30 degrees below zero Centigrade of 1 foot pound per inch.

EXAMPLE 1

Fifty seven parts by weight of maleated polypropylene having a weight average molecular weight of 150,000 (laboratory prepared by mixing ninety five parts high molecular weight polypropylene with three parts of maleic anhydride and six tenths part di-cumyl peroxide in a BANBURY brand polymer mixer at 200 rpm and 180–200 degrees Celsius for three minutes), thirty three parts by weight of thermoplastic elastomer (AFFINITY 8180 brand low density polyethylene from Dow) and ten parts by weight onium treated cation exchanging layered silicate material (montmorillonite treated with dimethyl, dihydrogenated tallow quaternary ammonium compound from Southern Clay) are mixed in a BANBURY brand polymer mixer at 100 rpm and a temperature of 150 degrees Celsius for ten minutes to produce a thermoplastic olefin nanocomposite having a flex modulus of 183,000 pounds per square inch and a notched IZOD impact strength at 30 degrees below zero Centigrade of 11.6 foot pound per inch. This example shows the substantial increase in impact strength of a thermoplastic olefin nanocomposite of the instant invention relative to the thermoplastic olefin nanocomposite of the COMPARATIVE EXAMPLE.

EXAMPLE 2

Thirty parts by weight of maleated polypropylene having a weight average molecular weight of 200,000, twenty seven parts by weight of non-maleated polypropylene having a weight average molecular weight of 150,000, thirty three parts by weight of thermoplastic elastomer (AFFINITY 8180 brand low density polyethylene from Dow) and ten parts by weight onium treated cation exchanging layered silicate material (montmorillonite treated with dimethyl, dihydrogenated tallow quaternary ammonium compound from Southern Clay) are mixed in a HAAKE brand polymer mixer at 200 rpm and a temperature of 180 degrees Celsius for ten minutes to produce a thermoplastic olefin nanocomposite. Electron microscopy examination of the polypropylene phase of the thermoplastic olefin nanocomposite shows that more than one half of the onium treated cation exchanging layered silicate material is apparent as single, double or triple layer units.

EXAMPLE 3

Twenty three parts by weight of maleated polypropylene having a weight average molecular weight of 150,000, forty two parts by weight of non-maleated high crystallinity polypropylene having a weight average molecular weight of 150,000, twenty five parts by weight of thermoplastic elastomer (AFFINITY 8180 brand low density polyethylene from Dow) and ten parts by weight onium treated cation exchanging layered silicate material (montmorillonite treated with dimethyl, dihydrogenated tallow quaternary ammonium compound from Southern Clay) are mixed in a BANBURY brand polymer mixer at 100 rpm and a temperature of 150 degrees Celsius for ten minutes to produce a thermoplastic olefin nanocomposite having a flex modulus of 184,000 pounds per square inch and a notched IZOD impact strength at zero degrees Celsius of 13.7 foot pound per inch. Electron microscopy examination of the polyethylene phase of the thermoplastic olefin nanocomposite shows that more than one half of the onium treated cation exchanging layered silicate material is apparent as single, double or triple layer units.

EXAMPLE 4

Twenty three parts by weight of maleated polypropylene having a weight average molecular weight of 150,000, forty two parts by weight of non-maleated high crystallinity polypropylene having a weight average molecular weight of 150,000, twenty five parts by weight of thermoplastic elastomer (AFFINITY 8180 brand low density polyethylene from Dow), five parts by weight of talc and ten parts by weight onium treated cation exchanging layered silicate material (montmorillonite treated with dimethyl, dihydrogenated tallow quaternary ammonium compound from Southern Clay) are mixed in a BANBURY brand polymer mixer at 100 rpm at a temperature of 150 degrees Celsius for ten minutes to produce a thermoplastic olefin nanocomposite having a flex modulus of 201,000 pounds per square inch and a notched IZOD impact strength at zero degrees Celsius of 12.7 foot pound per inch. Electron microscopy examination of the polyethylene phase of the thermoplastic olefin nanocomposite shows that more than one half of the onium treated cation exchanging layered silicate material is observed as single, double or triple layer units.

EXAMPLE 5

Ninety parts by weight of maleated polypropylene having a weight average molecular weight of 200,000, ten parts by weight of onium treated cation exchanging layered silicate material (montmorillonite treated with dimethyl, dihydrogenated tallow quaternary ammonium compound from Southern Clay) and two tenths part by weight of IRGONOX B225 brand antioxidant are mixed in a HAAKE brand polymer mixer at 200 rpm and a temperature of 180 degrees Celsius for ten minutes to produce a polypropylene nanocomposite. Electron microscopy examination of the polypropylene nanocomposite shows that more than one half of the onium treated cation exchanging layered silicate material is present as single, double or triple layer units.

What is claimed is:
1. A nanocomposite composition, comprising:
    (a) maleated polypropylene polymer having a weight average molecular weight greater than 100,000;
    (b) a cation exchanging layered silicate material dispersed in the maleated polypropylene so that more than one half of the cation exchanging layered silicate material is present as one, two, three, four or five layer units upon examination by electron microscopy.

2. The composition of claim 1, wherein the weight percent of the cation exchanging layered silicate material in the composition is more than one percent and less than thirty percent.

3. The composition of claim 2, wherein the weight percent of the cation exchanging layered silicate material in the composition is not more than about ten percent of the composition.

4. The composition of claim 2 where the weight percent of the cation exchanging layered silicate material is the composition in more than three percent.

5. The composition of claim 1 wherein the weight average molecular weight of the maleated polypropylene polymer is greater than 125,000.

6. The composition of claim 1 wherein the weight average molecular weight of the maleated polypropylene polymer is greater than 150,000.

7. The composition of claim 1 wherein the weight average molecular weight of the maleated polypropylene polymer is greater than 250,000.

8. The composition of claim 1, wherein the maleated polypropylene polymer is high crystallinity maleated polypropylene, wherein the heat of melting of the crystallites of the maleated polypropylene polymer is greater than 85 Joules per gram.

9. The composition of claim 1, further comprising non-maleated polypropylene in the maleated polypropylene polymer, the non-maleated polypropylene having a weight average molecular weight greater than 100,000.

10. The composition of claim 9, wherein the non-maleated polypropylene is high crystallinity non-maleated polypropylene, wherein the heat of melting of the non-maleated polypropylene crystallites is greater than 85 Joules per gram.

11. The composition of claim 1, wherein the maleated polypropylene polymer phase is essentially free of a maleated polypropylene oligomer.

12. The composition of claim 1, wherein the impact toughness at zero degrees Celsius by the notched IZOD test of the composition is increased by more than fifty percent in comparison to a composition being the same except that the weight average molecular weight of the maleated polypropylene is less than 100,000.

13. The composition of claim 1, further comprising talc or other conventional filler material.

14. The composition of claim 1 further comprising: a thermoplastic elastomer phase interdispersed with the maleated polypropylene phase.

15. The composition of claim 14, wherein the weight percent of the cation exchanging layered silicate material in the composition is more than one percent and less than thirty percent.

16. The composition of claim 15, wherein the weight percent of the cation exchanging layered silicate material in the composition is not more than about ten percent of the composition.

17. The composition of claim 15 wherein the weight percent of the cation exchanging layered silicate material in the composition is more than three percent.

18. The composition of claim 14, wherein the weight average molecular weight of the maleated polypropylene polymer is greater than 125,000.

19. The composition of claim 14, wherein the weight average molecular weight of the maleated polypropylene polymer is greater than 150,000.

20. The composition of claim 14, wherein the weight average molecular weight of the maleated polypropylene polymer is greater than 250,000.

21. The composition of claim 14, wherein the maleated polypropylene polymer is high crystallinity maleated polypropylene, wherein the heat of melting of the crystallites of the maleated polypropylene polymer is greater than 85 Joules per gram.

22. The composition of claim 14, further comprising non-maleated polypropylene in the maleated polypropylene polymer phase, the non-maleated polypropylene having a weight average molecular weight greater than 100,000.

23. The composition of claim 14, wherein the non-maleated polypropylene is high crystallinity non-maleated polypropylene, wherein the heat of melting of the non-maleated polypropylene crystallites is greater than 85 Joules per gram.

24. The composition of claim 14, wherein the maleated polypropylene polymer phase is free of a maleated polypropylene oligomer.

25. The composition of claim 14, wherein the impact toughness at zero degrees Celsius by the notched IZOD test of the composition is increased by more than fifty percent in comparison to a composition being the same except that the weight average molecular weight of the maleated polypropylene is less than 100,000.

26. The composition of claim 14, further comprising talc or other conventional filler material.

27. An article of manufacture, comprising: an object formed of the composition of claim 14.

28. The article of manufacture of claim 27, wherein the object is a motor vehicle part.

29. An article of manufacture comprising an object formed of the composition of claim 1.

30. The article of manufacture of claim 28 wherein the object is a motor vehicle part.

31. A process comprising the steps of:
  (a) mixing a softened or melted polypropylene polymer with an organic peroxide and maleic anhydride to form a maleated polypropylene polymer; and
  (b) mixing the maleated polypropylene polymer with an onium treated cation exchanging layered silicate material to form a maleated polypropylene nanocomposite, the process characterized by the maleated polypropylene having a weight average molecular weight greater than 100,000.

32. The process of claim 31 further comprising: mixing the maleated polypropylene nanocomposite with a thermoplastic elastomer.

* * * * *